May 6, 1969 K. BABEL 3,442,200
FOOD VENDING APPARATUS
Filed Feb. 21, 1967

INVENTOR
KURT BABEL
BY Robert I. Sainoff
ATTORNEY

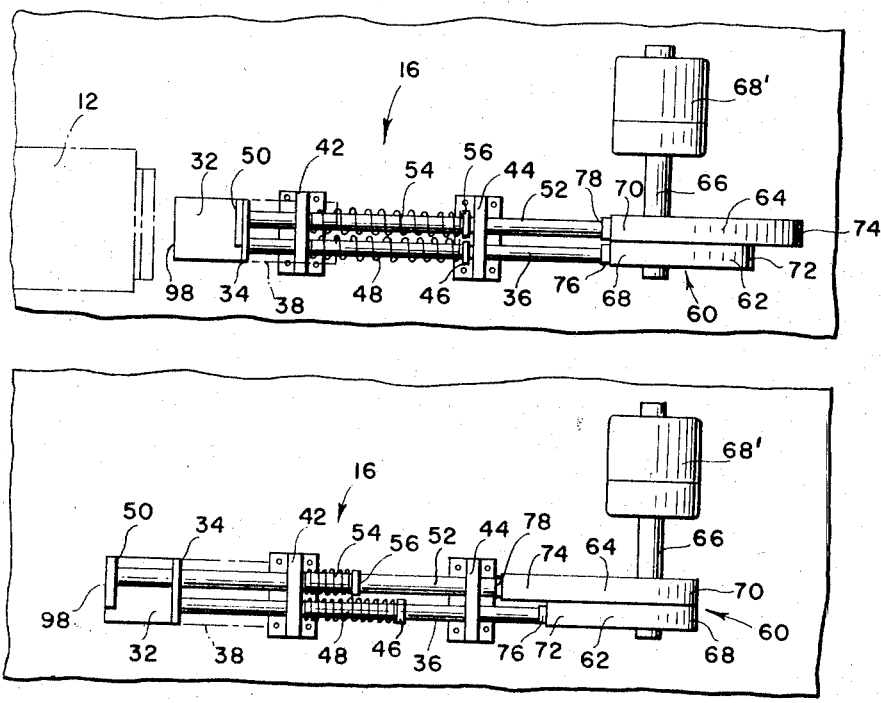
FIG. 3
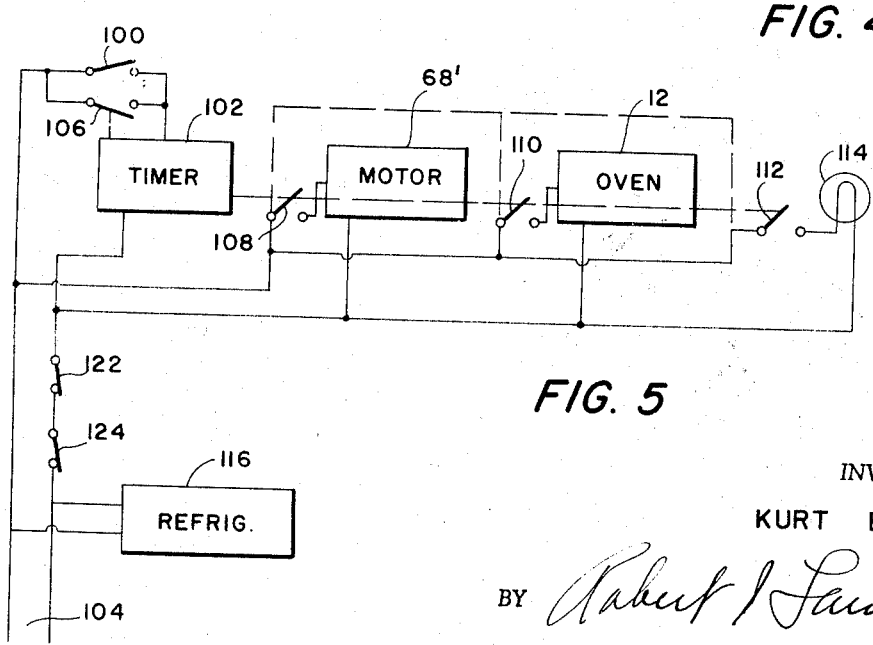
FIG. 4
FIG. 5
INVENTOR
KURT BABEL

United States Patent Office 3,442,200
Patented May 6, 1969

3,442,200
FOOD VENDING APPARATUS
Kurt Babel, 3 Henry St., Passaic, N.J. 07055
Filed Feb. 21, 1967, Ser. No. 623,492
Int. Cl. A47j 27/00; B65h 3/00; G07f 11/22
U.S. Cl. 99—357                                        8 Claims

ABSTRACT OF THE DISCLOSURE

In the disclosed embodiment of the invention, food products, such as frankfurters, are placed in boxes stacked in a refrigerated hopper. The lowermost box in the stack is received on a loading shelf, which is caused to move the box into a microwave oven where it is pushed off the shelf. After the shelf is withdrawn, the food product is cooked in the oven.

Background of the invention

This invention relates to vending machines and, more particularly, to apparatus for storing, cooking, and dispensing food products, such as frankfurters.

In recent years, self-service canteens employing coin-operated food vending machines have become widespread. It has been recognized that the utility and popularity of canteens of this character are greatly augmented, when freshly cooked food is dispensed thereby. Accordingly, a number of vending machines which store, cook and dispense food products, such as frankfurters, have been introduced in the prior art.

These prior art machines have been characterized by the provision of conveying means in which the food product is stored and by which the food product is transported to a cooking station. In the weiner vending machine shown in Simpkins, U.S. Patent No. 2,390,277, for example, weiners are stored on individual shelves which are supported for movement with a continuous chain conveyor and which are moved thereby to a location adjacent to a cooking station. The weiners are then transferred to the cooking station where they are connected to electrodes for direct heating by electric current. Machines of this type suffer from certain practical drawbacks. Since continuous conveyors occupy considerable space, a fairly extensive volume of the machine must be refrigerated to prevent spoilage of the weiners. Moreover, the means for transferring the weiners to the electrodes is complex. Although present-day microwave ovens provide very efficient and rapid cooking, machines of this character are not easily adapted to the requirements of microwave ovens, which must be closed during the cooking operation.

Accordingly, it is an object of the invention to provide food vending apparatus for storing, cooking, and dispensing food products which avoids the above-mentioned disadvantages of the prior art.

More specifically, it is an object of this invention to provide a food vending machine of this character which will compactly store the food products to be dispensed, which comprises simple and uncomplicated apparatus for transferring the food products to a cooking chamber, and which employs a microwave oven chamber for cooking the food products.

Another object of the invention is the provision, in a food vending machine, of a loading shelf which rectilinearly transfers the lowermost item from a stack to a chamber and which includes means for blocking the next lowermost item in the stack from dropping until the shelf is returned to its original position.

Other objects include the provision of means for opening the door of a microwave oven in response to the movement of a loading shelf to transfer a food product into the oven; and the provision of cam means to effectuate the movement of the loading shelf into the oven, to cause the item to be pushed off the loading shelf in the chamber, and to return the loading shelf to a position to receive an additional item to be dispensed.

Summary of the invention

Briefly, the invention contemplates the separation of the storage and conveying functions of the apparatus. A refrigerated hopper stores a vertical stack of boxes, each of which contains a food product, such as a frankfurter. The lowermost box in the stack is received on a loading shelf. After an appropriate coin or coins are deposited, the loading shelf is moved into a microwave oven, a door of which is lowered in response to movement of the shelf. A pusher then pushes the box from the shelf to deposit it in the oven. The movements of the loading shelf and pusher are controlled by coupling them, respectively, to two cam surfaces, which have first similarly shaped and dimensioned portions radially spaced from a common shaft and second differently shaped and dimensioned portions radially spaced a relatively greater extent from the shaft, the second portion of the surface coupled to the pusher being spaced a greater radially distance from the shaft than the second portion of the surface coupled to the loading shelf. In this way, the loading shelf and pusher first move in unison, and then, as the coupling means engage the second portions of the respective cam surfaces, the pusher is caused to move more rapidly to push the box from the shelf in the oven. A blocking plate is mounted for movement with the shelf to prevent the next to the lowermost box in the stack from dropping until the loading shelf is returned to its original position. After the box is deposited in the oven, the oven is energized for a cooking interval.

The foregoing and other objects, advantages, and features of the invention and the manner in which the same are accomplished will become more readily apparent upon consideration of the following detailed description of the invention when taken in conjunction with the accompanying drawings, which illustrate a preferred and exemplary embodiment of the invention.

Brief description of the drawings

In the accompanying drawings:

FIGURE 3 is a partial schematic plan view showing the loading means in said first position;

FIGURE 4 is a partial schematic plan view showing the loading means in said second position; and FIGURE 5 is a schematic diagram of the electrical circuit of the machine.

Referring to FIGURE 1, it will be seen that a food vending apparatus of the invention includes a housing 10, a microwave oven 12, a vertical hopper 14 for storing food items to be dispensed, and loading means, generally indicated by reference numeral 16, for loading the items in the oven.

Figure 1:
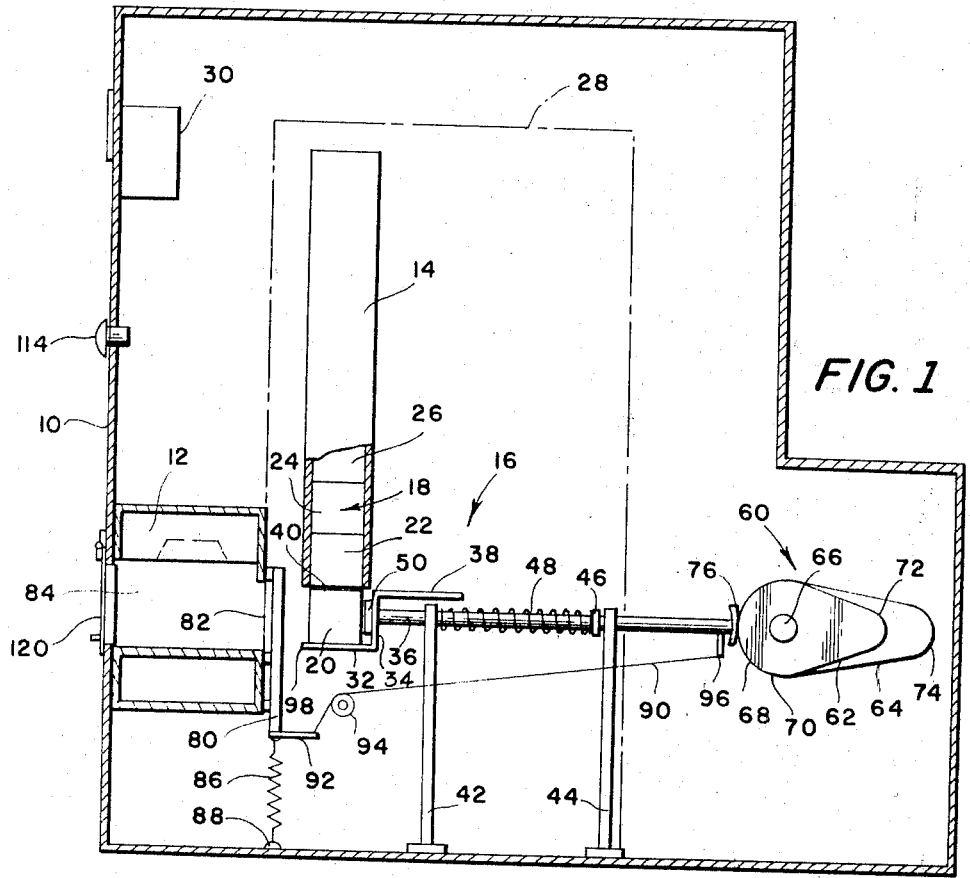
FIGURE 1 is a schematic vertical sectional view of a vending machine of the invention, showing a first position of the loading means of the machine.

Vertical hopper 14 stores a vertical stack 18 of items to be dispensed. It will be observed that the items to be dispensed are in the form of containers, or boxes, four of which 20, 22, 24 and 26 may be seen in FIGURE 1. Each of these containers contains a food product, such as a frankfurter, and is provided with a flat lower surface and a flat upper surface to facilitate stacking and handling thereof.

In order to prevent spoilage of the food products within the boxes, the vertical hopper 14 and the entire stack of boxes, including lowermost box 20, are located in a refrigerated potrion 28 of housing 10. It is to be undrestood that this refrigerated potrion of the housing need be no greater in extent than is necessary to enclose the vertical hopper and the lowermost box 20, but it should be so arranged that it does not interfere with the operation of loading means 16.

As already mentioned, loading means 16 is provided for loading the boxes, one at a time, upon the deposit in a coin box 30 of an appropriate coin, or coins, of proper denomination. The loading means 16 includes a loading shelf 32 which receives the lowermost box 20 of stack 18. Shelf 32 is cantilevered from a vertical plate 34 which is supported on the end of a loading rod 36. The upper end of vertical plate 34 supports a rearwardly extending blocking plate 38 (shown in phantom line in FIGURES 3 and 4) which, as will be observed from FIGURE 1, has a top surface in the same plane as the top surface 40 of box 20. Rod 36 is supported for sliding movement by a pair of vertical standards 42 and 44 and supports a spring abutment plate 46. In order to bias rod 36 rearwardly (to the right as seen in the drawings) a compression spring 48 is positioned about rod 36 between vertical standard 42 and spring abutment plate 46.

Figure 2:
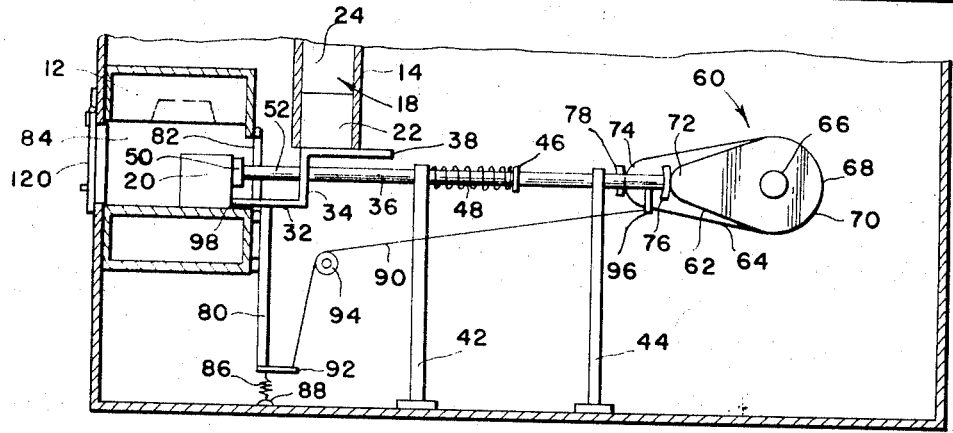
FIGURE 2 is a partial schematic vertical section view, corresponding to the view of FIGURE 1, but showing the loading means in a second position.

As can best be seen in FIGURES 2, 3 and 4, loading means 16 also includes a pusher plate 50 which is positioned forwardly of vertical plate 34 and which is mounted on the end of a pusher rod 52. The pusher rod extends through an opening in vertical plate 34 and is slidably supported by openings through vertical standards 42 and 44. This rod is also biased rearwardly by a compression spring 54 mounted thereon between vertical standard 42 and a spring abutment plate 56 located on the rod.

In order to regulate the movement of rods 36 and 52 and, hence, loading shelf 32 and pusher plate 50, cam means 60 is provided. The cam means 60 includes two cam surfaces 62 and 64 which are mounted for rotation about a common shaft 66 driven by a motor 68'. It will be observed that cam surfaces 62 and 64 each have a first low-rise portion radially spaced relatively close to shaft 66, these portions of surfaces 62 and 64 being designated by reference numerals 68 and 70, respectively. It will be observed that portions 68 and 70 are similarly shaped and have substantially identical dimensions, being spaced equally from shaft 66.

In addition, cam surface 62 has a high-rise portion 72 radially spaced a relatively greater distance from shaft 66 than portion 68. Likewise, cam surface 64 has a high-rise portion 74 which is also spaced a greater distance from shaft 66 than first portion 70 and which, in addition, is spaced a greater distance from shaft 66 than high-rise portion 72 of surface 62.

Loading rod 36 is coupled to cam surface 62 through a cam follower plate 76 mounted on the rearward end thereof. Similarly, pusher rod 52 is provided with a cam follower plate 78 coupled to cam surface 64.

Since microwave oven 12 must be closed during a cooking operation, it is necessary to provide a door 80 to cover a load receiving opening 82 of oven chamber 84. In order to provide access to chamber 84, door 80 is mounted for vertical reciprocation to uncover opening 82. To this end, door 80 is normally biased toward its open position, as shown in FIGURE 2, by means of a tension spring 86 connected between the lower end thereof and the bottom of the housing at 88. It is, on the other hand, maintained in its closed position when loading rod 36 is in its rearward position, as shown in FIGURE 1, by means of a cable 90. The cable is connected to a cable mounting lug 92 at the lower end of door 80, passes over a pulley 94, and is attached to a lug 96 mounted on loading rod 36. As will be readily apparent, the distance between the front edge 98 of loading shelf 32 and door 80 must be equal to or greater than the movement of the door necessary to uncover opening 82. (It is to be understood that the drawings are not drawn to scale, and the distance between edge 98 and door 80, as drawn, is foreshortened relative to the movement of the door.)

Upon energization of motor 68', in a manner to be described more fully hereinafter, shaft 66 begins rotation from the position shown in FIGURE 1. Since portions 68 and 70 of cam surfaces 62 and 64 are substantially identical, both loading shelf 32 and pusher plate 50 will move forward in unison. As rod 36 moves forward, the tension in cable 90 will slacken, permitting spring 86 to pull door 80 downwardly to uncover opening 82. Blocking plate 38 is also moved below box 22 to prevent it from dropping. After the second portions of the respective cam surfaces are reached, due to the greater rise of portion 74, pusher plate 50 will move forward more rapidly than shelf 32 until the positions shown in FIGURES 2 and 4 are attained. Thus, after the forward portion of shelf 32 enters chamber 84, box 20 is pushed from shelf 32 by the more rapid forward movement of pusher 50. In this manner, box 20 is removed from loading shelf 32 and deposited in heating chamber 84 of microwave oven 12.

As the rotation of shaft 66 proceeds, and after the high points of cam surface portions 72 and 74 are passed, loading shelf 32 and pusher 50 will begin to withdraw until they again reach the position shown in FIGURES 1 and 3. Blocking plate 38 will then permit box 22 to drop to shelf 32. At the same time, the backward movement of loading rod 36 will again tension cable 90 and cause door 80 to slide upwardly and again close the heating chamber 84 of microwave oven 12.

A schematic of the control circuit of the vending apparatus of the invention is shown in FIGURE 5. The coin box 30 contains a coin box switch 100 which, in response to the receipt of a coin or coins of proper denomination, serves to close momentarily and energize a conventional timer 102 connected across a power supply line 104. The timer immediately closes a holding switch 106 to maintain its energization after coin switch 100 opens. It will be seen that timer 102 controls a switch 108 for motor 68' to initiate the loading action described hereinabove. After the lowermost box 20 has been deposited in chamber 84 of microwave oven 12, loading shelf 32 and pusher plate 50 withdrawn therefrom, and door 80 closed, switch 108 is opened by timer 102 to de-energize the motor 68'. An oven switch 110 is then closed. After a cooking interval has expired, switch 110 is opened to deenergize oven 12. The timer then closes an indicator light switch 112 to energize an indicator light 114 which is mounted on the front panel of housing 10. Switch 112 remains closed for an interval of about thirty seconds to indicate that the food product is cooked and ready for consumption. At this time, holding switch 106 is opened to deenergize the timer.

It is to be noted that refrigeration apparatus 116 is directly connected across power supply 104 so that refrigerated enclosure 28 is continuously refrigerated under the control of the usual thermostat switch included in the refrigeration apparatus.

In order to supply access to the food product after it has been cooked and after the indicator light 112 is energized, a front door 120 of oven chamber 84 may be opened for removal of the food product by the customer. In order to prevent energization of the oven while door 120 is opened a door switch 122 is provided to open the circuit to power supply line 104. In addition, a panel switch 124 is provided to be opened upon the removal of a rear housing panel (not shown) when access to the interior of the apparatus is desired.

The invention claimed is:

1. A vending machine comprising: hopper means for storing a vertical stack of items to be dispensed; a chamber for receiving said items to be dispensed; and loading means for rectilinearly moving the lowermost item in said stack into said chamber, said loading means comprising a shelf for receiving said lowermost item from said hopper means, means for moving said shelf into said chamber, pusher means for pushing said item off said shelf after said shelf has moved into said chamber, and cam means having a first cam surface coupled to said means for moving said shelf means and a second cam surface coupled to said pusher means, said first and second cam surfaces being mounted to rotate with a common shaft, said first and second cam surfaces having first similarly shaped and dimensioned portions radially spaced from said shaft and second differently shaped and dimensioned portions radially spaced relatively further from said shaft than said first portions, said second portion of said second surface being spaced a greater radial distance from said shaft than said second portion of said first cam surface, whereby said shelf moving means and pusher means move in unison when coupled to said respective first portions of said cam surfaces and said pusher means moves more rapidly when said shelf moving means and pusher means are coupled to said respective second portions of said cam surfaces.

2. A vending machine as recited in claim 1, further comprising a door for said chamber and means coupled to said loading means for opening said door upon movement of said lowermost item forward toward said chamber.

3. A vending machine as recited in claim 1, wherein said items have flat upper and lower surfaces; and said loading means comprises a blocking plate extending rearwardly of said shelf at the level of the upper flat surface of said lowermost item and mounted for movement with said shelf, whereby upon forward movement of said shelf toward said chamber said blocking plate will prevent the next item stacked on said lowermost item from dropping and upon rearward movement of said shelf from said chamber said blocking plate will permit said next item to drop to said shelf.

4. A vending machine comprising: hopper means for storing a vertical stack of food items to be dispensed; a cooking chamber for receiving said food items to be dispensed; loading means for rectilinearly moving the lowermost food item in said stack into said cooking chamber; said loading means comprising a shelf for receiving said lowermost food item from said hopper means, means for moving said shelf into said cooking chamber, pusher means for pushing said food item off said shelf after said shelf has moved into said chamber, and cam means having a first cam surface coupled to said means for moving said shelf means and a second cam surface coupled to said pusher means, said first and second cam surfaces being mounted to rotate with a common shaft, said first and second cam surfaces having first similarly shaped and dimensioned portions radially spaced from said shaft and second differently shaped and dimensioned portions spaced relatively further from said shaft than said first portions, said second portion of said second surface being spaced a greater radial distance from said shaft than said second portion of said first cam surface, whereby said shelf moving means and pusher means move in unison when coupled to said respective first portions of said cam surfaces and said pusher means moves more rapidly when said shelf moving means and pusher means are coupled to said respective second portions of said cam surfaces.

5. A vending machine as recited in claim 4, wherein said cooking chamber comprises a microwave oven.

6. A vending machine as recited in claim 4, further comprising refrigeration means for refrigerating said items while in said vertical stack.

7. A vending machine as recited in claim 4, further comprising a door for said chamber and means coupled to said loading means for opening said door upon movement of said lowermost item toward said chamber.

8. A vending machine as recited in claim 4, wherein said food items comprise a container having flat upper and lower surfaces and a food product in said container; and said loading means comprises a blocking plate extending rearwardly of said shelf at the level of the upper flat surface of the container of said lowermost item and mounted for movement with said shelf, whereby upon forward movemnet of said shelf toward said chamber said blocking plate will prevent the next container in said stack from dropping and upon rearward movement of said shelf from said chamber said blocking plate will permit said next container to drop to said shelf.

References Cited

UNITED STATES PATENTS

| | | |
|---|---|---|
| 569,775 | 10/1896 | Vail. |
| 900,390 | 10/1908 | Kingsley. |
| 1,461,417 | 7/1923 | Giles. |
| 2,363,724 | 11/1944 | Ford _____ 99—357 |
| 2,390,277 | 12/1945 | Simpkins _____ 99—357 |
| 2,405,342 | 8/1946 | Brosius _____ 214—29 |
| 2,590,580 | 3/1952 | Schiavone. |
| 2,678,138 | 5/1954 | Edwards _____ 221—273 |
| 2,950,024 | 8/1960 | Adler. |
| 3,224,643 | 12/1965 | White _____ 221—150 |
| 3,335,656 | 8/1967 | Smith _____ 99—357 |

BILLY J. WILHITE, *Primary Examiner.*

U.S. Cl. X.R.
221—150, 248, 273.